(12) United States Patent
Nishimoto et al.

(10) Patent No.: US 9,663,155 B2
(45) Date of Patent: May 30, 2017

(54) MOTORCYCLE BODY COVER CONSTRUCTION

(71) Applicant: HONDA MOTOR CO., LTD., Tokyo (JP)

(72) Inventors: Taro Nishimoto, Wako (JP); Taishi Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/900,385

(22) PCT Filed: Jul. 31, 2013

(86) PCT No.: PCT/JP2013/070817
§ 371 (c)(1),
(2) Date: Dec. 21, 2015

(87) PCT Pub. No.: WO2015/015609
PCT Pub. Date: Feb. 5, 2015

(65) Prior Publication Data
US 2016/0144904 A1 May 26, 2016

(51) Int. Cl.
*B62D 35/00* (2006.01)
*B62J 17/00* (2006.01)
(Continued)

(52) U.S. Cl.
CPC .............. *B62D 35/00* (2013.01); *B62J 17/00* (2013.01); *B62K 11/00* (2013.01); *B62K 19/48* (2013.01); *B62K 2202/00* (2013.01)

(58) Field of Classification Search
CPC ........... B62D 35/00; B62J 17/00; B62J 17/02; B62K 19/48
(Continued)

(56) References Cited

U.S. PATENT DOCUMENTS 4,564,081 A * 1/1986 Hamane ..................... B62J 7/00
180/229
7,438,340 B2 * 10/2008 Kurihara .................. B62J 17/06
296/37.1
(Continued)

FOREIGN PATENT DOCUMENTS

JP 01-111587 A 4/1989
JP 3817659 B2 9/2006
(Continued)

OTHER PUBLICATIONS

International Search Report and Written Opinion dated Oct. 29, 2013 corresponding to International Patent Application No. PCT/JP2013/070817 and English translation thereof.

*Primary Examiner* — Jason S Morrow
(74) *Attorney, Agent, or Firm* — Squire Patton Boggs (US) LLP (57) ABSTRACT

A body cover construction for a motorcycle includes a body cover having a front cover which covers a front portion of a vehicle body. A front lower cover covers a front surface of the vehicle body, below the front cover and which has a curved opposite surface which continues from above to a rear of a front wheel to face opposite the front wheel. An undercover covers a lower surface of the vehicle body lying further forwards than a power unit and lighting further rearwards than the front lower cover. A lower end portion of the front lower cover has a curved portion and can extend rearwards to be connected to the undercover. The curved portion is formed so that a radius at a transverse center is larger than radii at transverse end portions.

6 Claims, 10 Drawing Sheets

(51) Int. Cl.
*B62K 19/48* (2006.01)
*B62K 11/00* (2006.01)

(58) Field of Classification Search
USPC .................................................. 296/78.1
See application file for complete search history.

(56) References Cited

U.S. PATENT DOCUMENTS

| | | | | |
|---|---|---|---|---|
| 2005/0155804 A1* | 7/2005 | Kamemizu | ............... | B62J 7/04 180/219 |
| 2006/0021814 A1* | 2/2006 | Hasegawa | ............... | B62J 17/02 180/219 |
| 2007/0240924 A1* | 10/2007 | Kurihara | ............... | B62J 17/02 180/219 |
| 2008/0156557 A1* | 7/2008 | Okamoto | ............... | B62J 17/00 180/219 |
| 2009/0108621 A1* | 4/2009 | Matsuo | ............... | B62J 17/04 296/91 |
| 2009/0108630 A1 | 4/2009 | Nakao et al. | | |
| 2012/0061989 A1* | 3/2012 | Yasuhara | ............... | B62J 6/005 296/78.1 |
| 2015/0246697 A1* | 9/2015 | Kishima | ............... | B62D 25/16 296/180.1 |
| 2016/0121954 A1* | 5/2016 | Sasaki | ............... | B62K 5/027 280/269 |
| 2016/0144904 A1* | 5/2016 | Nishimoto | ............... | B62J 17/00 280/281.1 |
| 2016/0176464 A1* | 6/2016 | Ishikawa | ............... | B62J 23/00 280/291 |

FOREIGN PATENT DOCUMENTS

| | | |
|---|---|---|
| JP | 2009-107568 A | 5/2009 |
| JP | 2013-375587 A | 4/2013 |
| WO | WO 2004/078572 A1 | 9/2004 |

* cited by examiner

MOTORCYCLE BODY COVER CONSTRUCTION

TECHNICAL FIELD

The present invention relates to a motorcycle body cover construction.

BACKGROUND ART

In a vehicle such as a conventional motorcycle, for example, as described in Patent Document 1, a construction is disclosed in which a deflector plate and an air induction opening are provided in a front lower cover which is disposed at a lower side of a front cover and at the rear of a front wheel. According to this construction, air flows are guided toward a radiator through the air induction opening.

PRIOR ART DOCUMENT

Patent Document

Patent Document 1: JP-3817659-B1

SUMMARY OF THE INVENTION

Problem that the Invention is to Solve

However, air flows which pass through a lower portion of the front lower cover stagnate in the vicinity of a transverse center of a vehicle body due to a restriction placed by the shape of the front lower cover, causing an air drag to be produced while the motorcycle is being ridden. Additionally, cooling a power unit which is positioned at the rear of the front lower cover is dealt with by introducing air flows inside a body cover to reach the power unit. However, introducing air flows to the inside of the body cover requires the air induction opening at the front of the vehicle body and a duct construction which guides the air flows introduced into the body cover to a predetermined location, which complexes the body cover construction.

The invention has been made in view of these situations, and an object thereof is to provide a motorcycle body cover construction which can reduce the air drag by eliminating the stagnation of air flows which pass through a lower portion of a front lower cover and which can cool effectively a power unit by a simple construction which utilizes air flows.

Means for Solving the Problem

With a view to achieving the object, according to an invention of claim 1, there is provided
a body cover construction for a motorcycle comprising a body cover having:
a front cover which covers a front portion of a vehicle body from a front to sides of a headstock;
a front lower cover which covers a front surface of the vehicle body, below the front cover and which has a curved opposite surface which continues from above to a rear of a front wheel to face opposite the front wheel; and
an undercover which covers a lower surface of the vehicle body lying further forwards than a power unit and lighting further rearwards than the front lower cover,
wherein a lower end portion of the front lower cover has a curved portion and is thus allowed to extend rearwards to be connected to the undercover, and
wherein the curved portion is formed so that a radius of curvature at a transverse center is larger than radii of curvature at transverse end portions thereof.

According to an invention of claim 2, in addition to the configuration of claim 1, there is provided the body cover construction,
wherein a rear end edge portion of the undercover forms an opening portion together with a unit lower end portion of the power unit and a lower edge portion of the body cover.

According to an invention of claim 3, in addition to the configuration of claim 1 or 2, there is provided the body cover construction,
wherein part of the power unit is positioned further downwards than the undercover.

According to an invention of claim 4, in addition to the configuration of any one of claims 1 to 3, there is provided the body cover construction,
wherein a recess portion is provided at a lower portion of the front lower cover, the recess portion having a step portion and receding rearwardly more at a transversely central portion than at transversely outer portions.

According to an invention of claim 5, in addition to the configuration of any one of claims 1 to 4, there is provided the body cover construction,
wherein a swelling portion is provided at an upper portion of the front lower cover, the swelling portion projecting forwards at a transverse center of the front lower cover and accommodating at least part of a main frame which extends downwards and rearwards from the headstock.

According to an invention of claim 6, in addition to the configuration of any one of claims 1 to 5, there is provided the body cover construction,
wherein a vertical cutting line along each of transverse end portions of the front lower cover which include the curved portion is formed into a rearwardly inclined shape in which an upper part of the vertical cutting line is positioned further rearwards than a front surface portion of the curved portion, and
wherein a vertical cutting line along a transverse center of the front lower cover which includes the curved portion is formed into a forwardly inclined shape in which an upper part of the vertical cutting line is positioned further forwards than the front surface portion of the curved portion.

Advantage of the Invention

According to the invention of claim 1, in the front lower cover, the curved portion which curves towards a rear end edge thereof is formed so that the radius of curvature at the transverse center is larger than the radii of curvature at transverse end portions thereof. Since this can reduce the flowing resistance of air flows at the transverse center, the air flows which are collected to the transverse center are allowed to flow from the transverse center to the rear of the vehicle body with good efficiency. As a result of this, the air drag that are be produced by the stagnant air flows can be reduced. The lower portion of the front lower cover is connected to the under cover while curving towards the rear of the vehicle body, whereby the air flows emerging from the front lower cover are allowed to flow smoothly to the rear along the undercover. As a result of this, the air drag of the air flows can be reduced.

According to the invention of claim 2, the opening portion is formed in the rear end edge portion of the undercover between the unit lower end portion of the power unit and the lower edge portion of the body cover. This enables a suction current to be produced which sucks out the air inside the opening portion therefrom when the air flows flowing from the front lower cover along the undercover flow to pass a position which faces the opening portion. As a result of this, the replacement of the air inside the body cover and the air around the power unit can be promoted. Consequently, it is possible to cool the power unit with good efficiency by the simple construction in which the opening portion is provided.

According to the invention of claim 3, the unit lower end portion which is part of the power unit is positioned further downwards than the undercover, and since this allows the air flows flowing along the undercover to be directed straight to the power unit, the engine can be cooled efficiently by the air flows.

According to the invention of claim 4, the recess portion is formed which has the step portion and which recedes more at the transversely central portion than at the transversely outer portions towards the rear of the vehicle body in the lower portion of the front lower cover. This makes it easier to guide the air flows directed to the transversely central portion to the central portion. The air flows which are collected to the central portion can be guided into the recess portion by the step portion so that the air flows can be guided smoothly to the rear of the vehicle body, thereby allowing the air flows to flow to the rear with better efficiency.

According to the invention of claim 5, the swelling portion provided at the upper portion of the front lower cover swells to the front of the vehicle body at the upper part and is inclined to the rear of the vehicle body at the lower part thereof so as to extend along the main frame. This makes it easy to guide the air flows that enter the inside of the front lower cover downwards towards the bottom of the vehicle body. Consequently, the air flows are allowed to flow towards the bottom and rear of the vehicle body effectively.

According to the invention of claim 6, the vertical cutting line along each of the transverse end portions of the front lower cover which contain the curved portion is formed into the rearwardly inclined shape in which the upper part of the vertical cutting line is positioned further rearwards towards the rear of the vehicle body than the front surface portion of the curved portion. This makes it each to collect the air flows flowing into the front lower cover to the transversely central portion. In addition to this, since the vertical cutting line along the transverse center of the front lower cover is formed into the forwardly inclined shape, the air flows which are collected to the transversely central portion can be guided downwards by a transversely central wall surface of the front lower cover so that the air flows can flow to the rear of the vehicle body effectively. As a result of this, a number of air flows are allowed to flow along the transversely central wall surface of the front under cover effectively, thereby reducing the air drag by the air flows.

BRIEF DESCRIPTION OF THE DRAWINGS

FIGS. 8A and 8B shows vertical sectional views of main parts of the front lower cover on the motorcycle shown in FIG. 5.

MODE FOR CARRYING OUT THE INVENTION

Referring to FIGS. 1 to 10, an embodiment of a body cover construction of a motorcycle according to the invention will be described. The drawings should be seen in a direction in which reference numerals given therein look normal. Fr, Rr, U, D, R, L shown in the drawings denote a front direction, a rear direction, an upper or upward direction, a lower or downward direction, a rightward direction, and a leftward direction of a vehicle of the embodiment, respectively.

A motorcycle 1 of this embodiment includes body frame 10. This body frame 10 includes, as shown in FIG. 1, a headstock 15 which is provided at a body front portion 10a, a main frame 51 which extends rearwards and downwards from the headstock 15, a front frame 52 which extends substantially rearwards from a middle portion of the main frame 51, a lower frame 53 which extends rearwards from a lower end of the main frame 51, and a rear frame 54 which extends upwards from a rear end of the lower frame 53 and then extends rearwards and upwards.

The motorcycle 1 includes a front fork 17 which is attached rotatably to the headstock 15, a steering handlebar 11 which is attached to an upper end portion of the front fork 17, a front wheel 18 which is mounted rotatably at a lower end portion of the front fork 17, a power unit 55 which is mounted so as to swing up and down via links 57 which are supported on a pivot 56 at a rear end portion of the lower frame 53, a rear wheel 19 which is mounted at a rear end portion of the power unit 55, rear cushions 61 which are mounted between a rear end of the power unit 55 and the rear frame 54, and a mounting seat 12 which is supported on the rear frame 54.

A main stand 65a and a side stand 65b are provided on the lower frame 53. An exhaust pipe 66 extends downwards from a cylinder portion 55a of the power unit 55 towards a bottom of a vehicle body, passes below the power unit 55 and connects to a muffler 67 at a rear of the vehicle body. The body frame 10 and the individual constituent members are covered externally by a body cover 20 as required.

Figure 1:
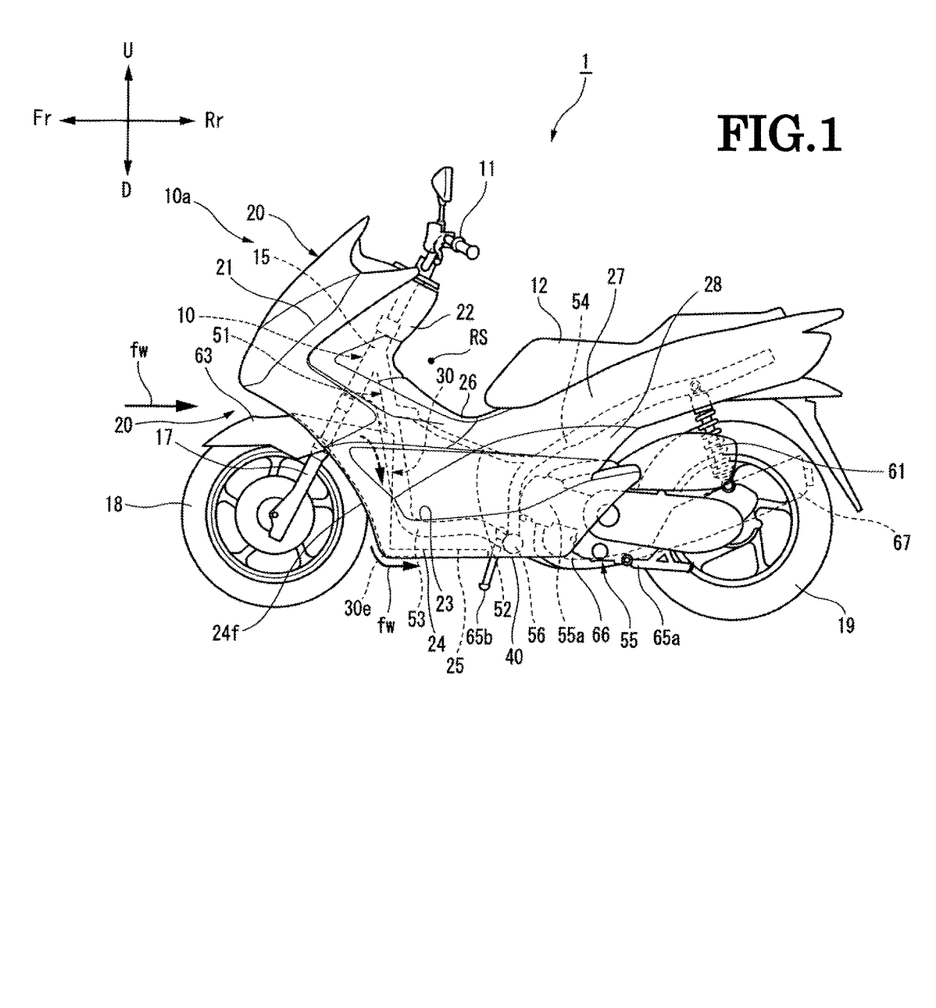
FIG. 1 is a left side view of a motorcycle to which one embodiment of a body cover construction according to the invention is applied.
Figure 2:
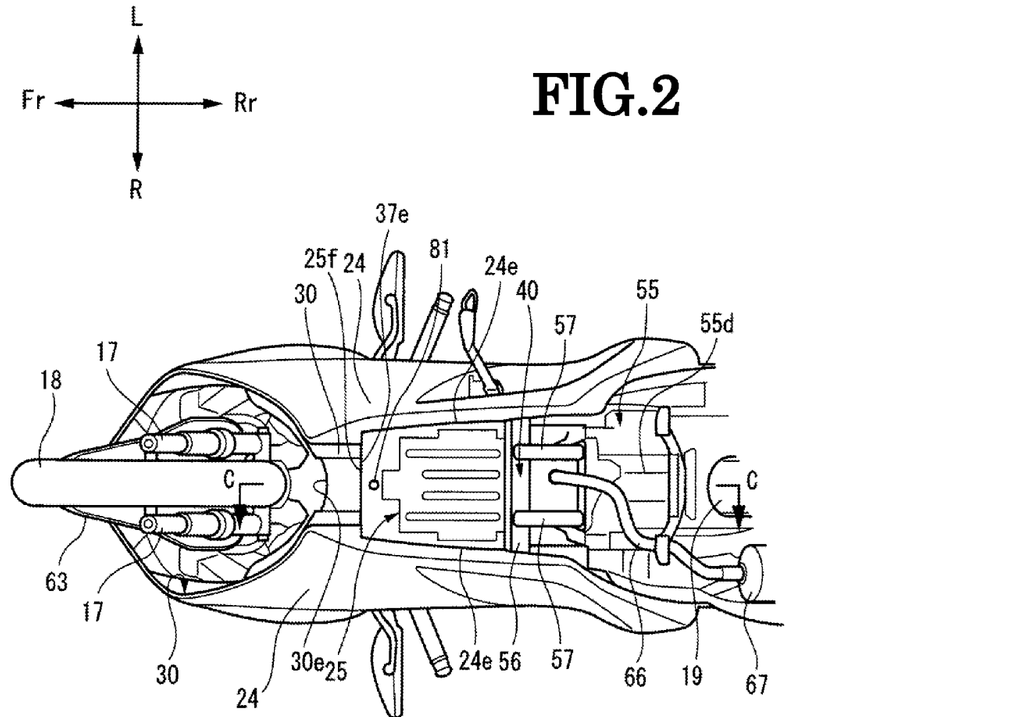
FIG. 2 is a bottom view of the motorcycle shown in FIG. 1.

As shown in FIGS. 1 and 2, the body cover 20 has a front cover 21 which covers continuously a front side and lateral sides of the headstock 15 and an inner cover 22 which covers a rear portion of the front cover 21. The body front portion 10a is covered by the front cover 21 and the inner cover 22. The body cover 20 has a center cover 26 which extends rearwards from the inner cover 22 to cover a center (both sides of the front frame 52) of the body frame 10 and side covers 27 which extend further rearwards from the center cover 26 to cover both sides (both sides of the rear frame 54) of a rear portion of the body frame 10.

The body cover 20 has further lower side covers 28 which cover both sides of lower portions of the center cover 26 and the side covers 27. The body cover 20 has additionally left and right foot platforms where feet of a rider rest, left and right under side covers 24 which extend downwards from outer edges of the foot platforms 23, an undercover 25 (refer to FIG. 2) which covers a space defined between lower edge portions 24e of the left and right under side covers 24, and a front lower cover 30 at a lower side of the front cover 21.

The undercover 25 is disposed, as shown in FIG. 2, so as to cover a body lower surface which lies further forwards than the power unit 55 in a position lying further rearwards towards the rear of the vehicle body than the front lower cover 30. In the motorcycle 1 of this embodiment, a space surrounded by the inner cover 22, the center cover 26 and the mounting seat 12 is formed as a straddle space RS which facilitates the mounting or dismounting of the rider on the motorcycle 1.

Referring to FIGS. 3 to 8B, the front lower cover 30 will be described in detail.

Figure 3:
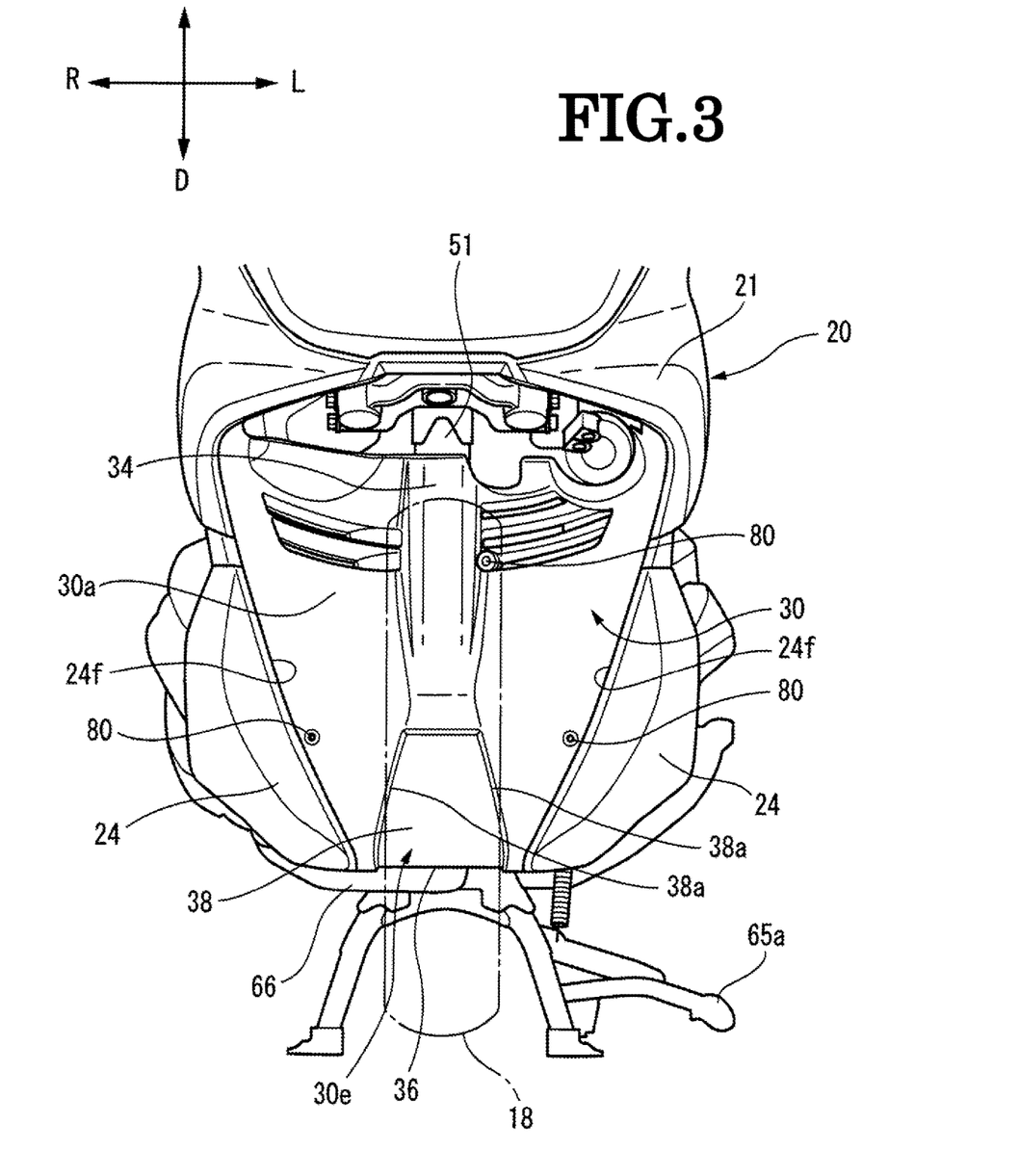
FIG. 3 is a front view showing a state in which a front lower cover is mounted on the motorcycle shown in FIG. 1.

The front lower cover 30 is, as shown in FIG. 3, disposed from sides to a rear of an upper portion of the front wheel 18 at a lower portion of the front cover 21. The front lower cover 30 includes an opposite surface 30a which is formed by a curved surface which curves towards the direction of the vehicle body so as to permit the front wheel 18 to turn. In the front lower cover 30, front edge portions 30f (refer to FIG. 4) of both lateral sides are connected to front edges 24f of the under side covers 24, and a rear end edge 37e is connected to a front end edge 25f of the undercover 25 (refer to FIG. 2).

Figure 4:
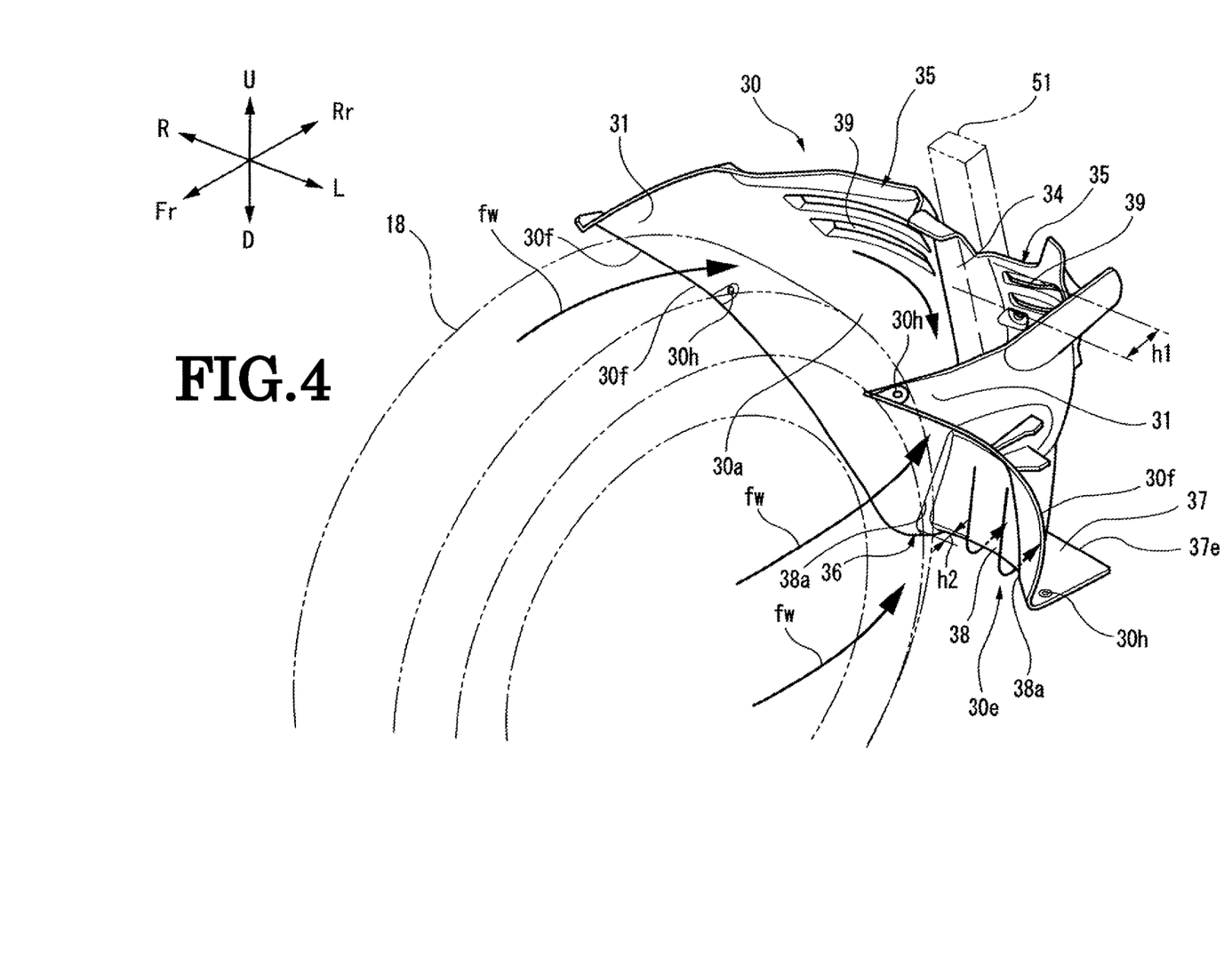
FIG. 4 is a perspective view of the front lower cover on the motorcycle shown in FIG. 1.
Figure 5:
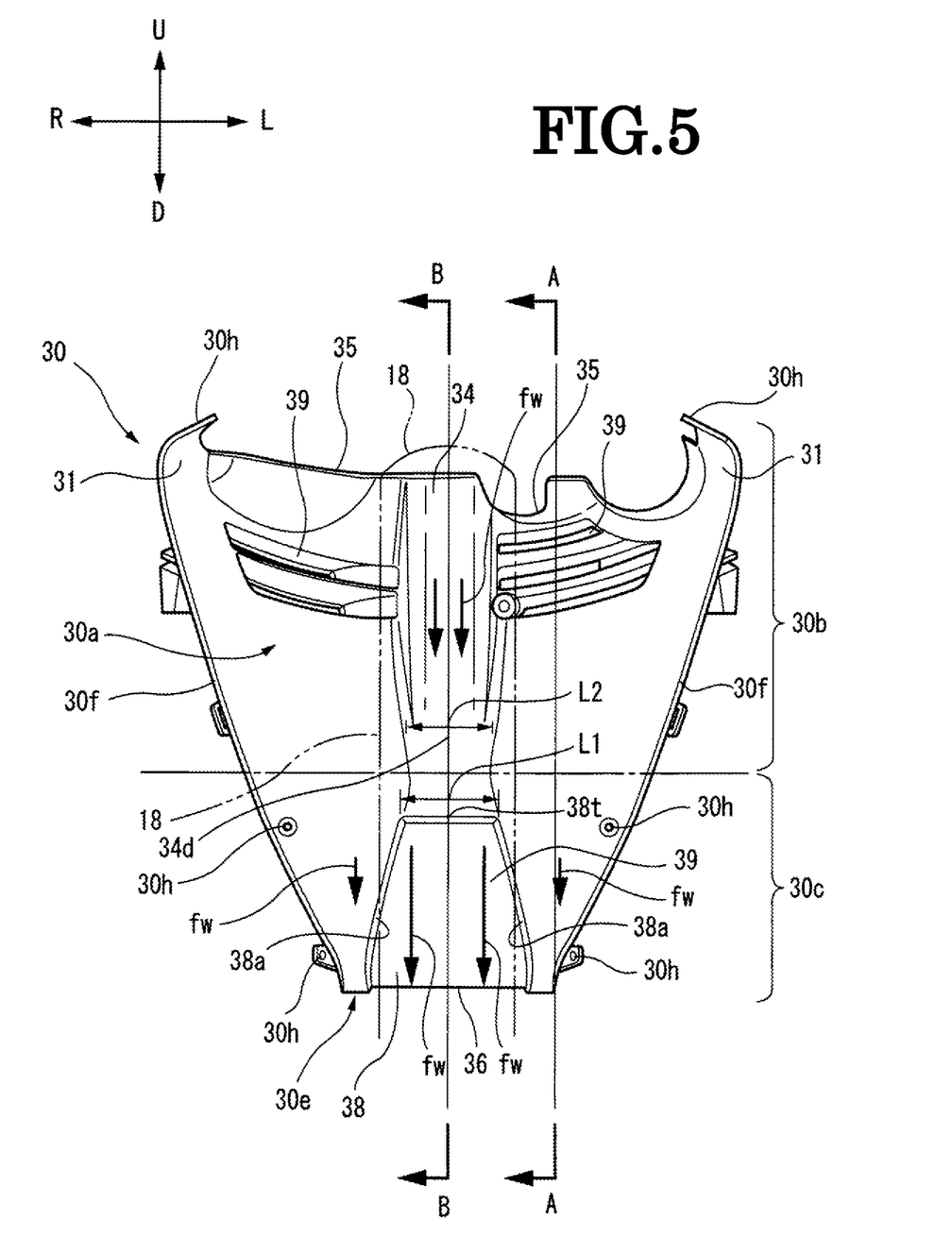
FIG. 5 is a front view of the front lower cover on the motorcycle shown in FIG. 1.

As shown in FIGS. 4 and 5, the front lower cover 30 can be divided into an upper portion 30b and a lower portion 30c at a vertically intermediate portion therebetween as a boundary. A swelling portion 34 is provided at a laterally central portion of the upper portion 30b where the opposite surface 30a is swollen to the front of the vehicle body. The upper portion 30b has rear walls 35, 35 (refer to FIG. 6) on both left- and right-hand sides of the swelling portion 34 which are curved surfaces curving to swell towards the rear of the vehicle body. Front upper portions 31, 31 are provided which continuously extend from the corresponding rear walls 35, 35 to the front of the vehicle body. These front upper portions 31, 31 are formed as wall surfaces in which their distal inner surfaces (the opposite surface 30a) are slightly twisted downwards towards the bottom of the vehicle body.

The swelling portion 34 formed at the upper portion 30b swells towards the front of the vehicle body so as to follow the main frame 51 which extends downwards towards the bottom of the vehicle body from the headstock 15. This swelling portion 34 has an inclined surface construction in which an upper end portion projects most towards the front of the vehicle while the swelling recedes towards the rear of the vehicle body as the swelling portion 34 extends downwards so as to match the inclination of the main frame 51. Namely, the swelling portion 34 is formed so that a projecting height h1 by which the swelling portion 34 projects towards the front of the vehicle body from the rear wall portions 35, 35 is gradually reduced as the swelling portion 34 extends downwards.

On the other hand, a curved portion 36 is formed at the lower portion 30c of the front lower cover 30 where a lower end portion 30e swells towards the front and bottom of the vehicle. A bottom portion 37 is formed at the lower end portion 30e so as to extend substantially horizontally towards the rear of the vehicle body from the curved portion 36. When viewed from the bottom of the motorcycle 1 (refer to FIGS. 2 and 9), the lower end portion 30e is formed into a curved shape in which a transversely central portion is situated in a rearmost position towards the rear of the vehicle body. The rear end edge 37e of the bottom portion 37 is connected to a lower surface of the undercover 25 so as to be level therewith (refer to FIG. 9).

Figure 8A:
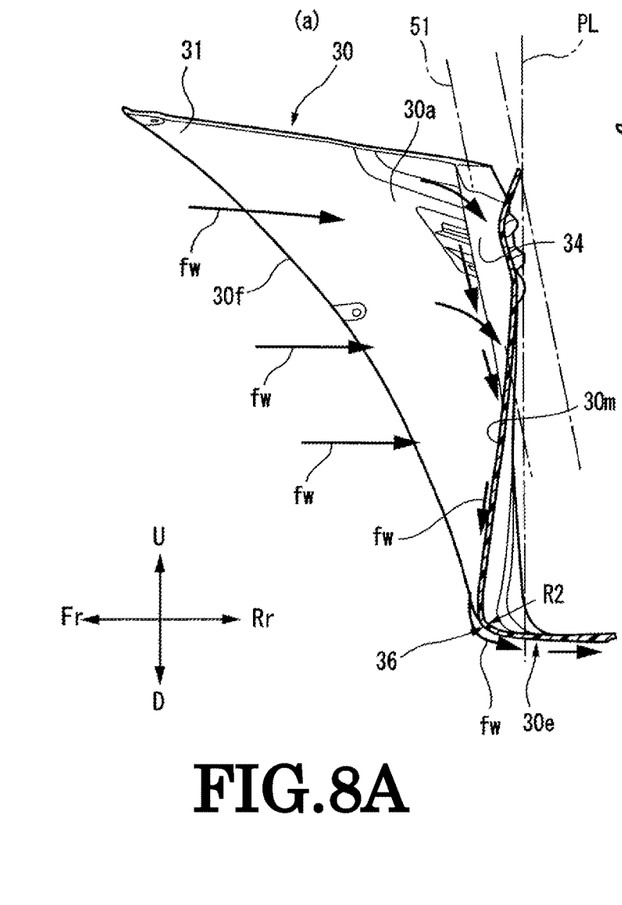
FIG. 8A is a vertical section of a portion taken along the line A-A in FIG. 5.
Figure 8B:
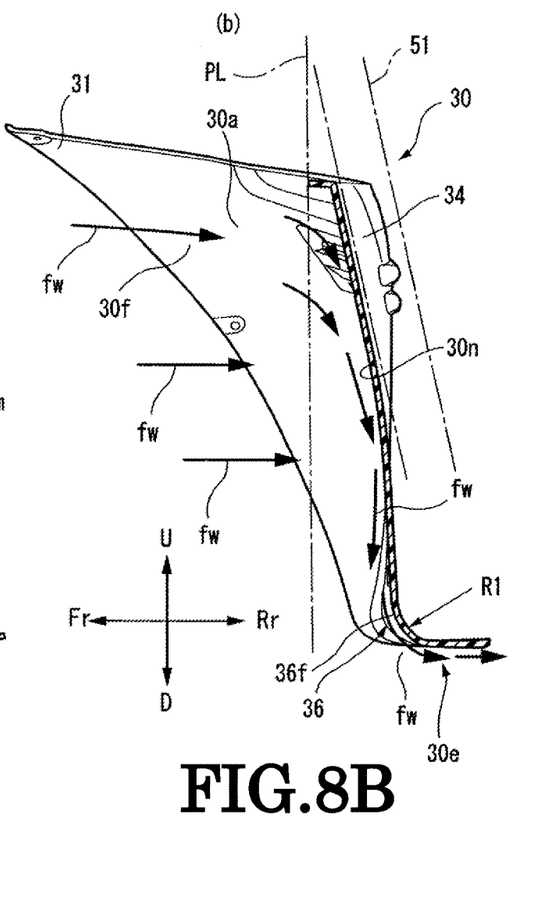
FIG. 8B is a vertical section of a portion taken along the line B-B in FIG. 5.

The curved portion 36 is formed so that its radius of curvature changes in a transversely lateral direction. Namely, as shown in FIGS. 8A and 8B, the radius of curvature of the curved portion 36 is formed so that a radius of curvature R1 at a transverse center is larger than a radius of curvature R2 at a transverse end portion. The radius of curvature of the curved portion 36 is also formed so that the radius of curvature is the largest at the transverse center and is then reduced gradually towards the transverse end portions.

Figure 7:
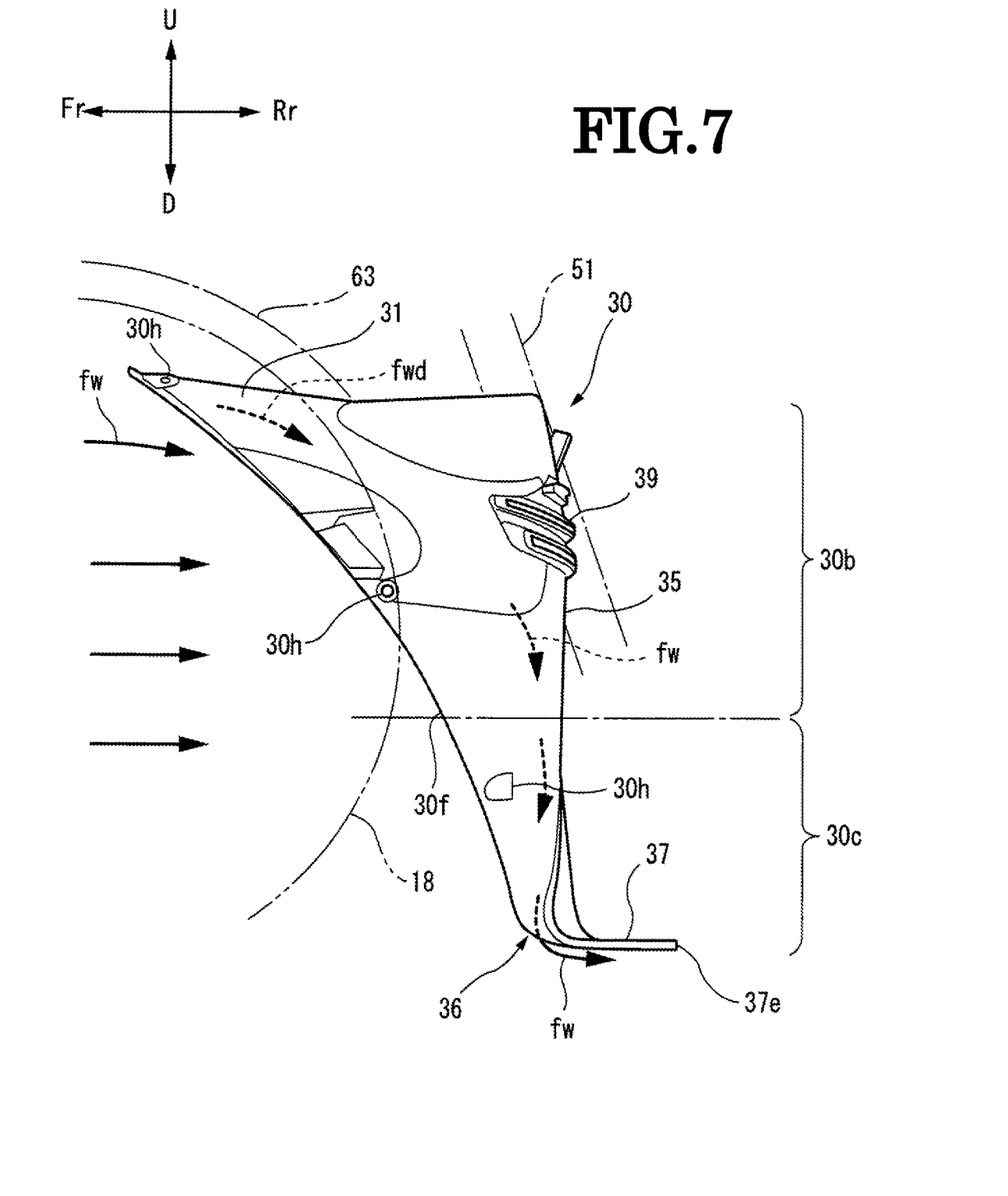
FIG. 7 is a side view of the front lower cover on the motorcycle shown in FIG. 1.

When viewed from the front, the front lower cover 30 is formed so that the left and right front edge portions 30f, 30f narrow a lateral space defined therebetween as they extend downwards from the upper portion 30b having the swelling portion 34 to the lower portion 30c, as shown in FIG. 5. When viewed from the side, as shown in FIG. 7, the front edge portion 30f is formed into a curved shape which swells towards the rear of the vehicle from the upper portion 30b to the lower portion 30c, and the bottom portion 37 which extends horizontally is provided at a lower end of the front lower cover 30. Thus, the front lower cover 30 has a substantially triangular shape when seen from the side thereof.

A recess portion 38 which recedes more at a transversely central portion than at transversely outer portions towards the rear of the vehicle body is formed at the lower portion 30c of the front lower cover 30 from the opposite surface 30a which includes the curved portion 36 to the bottom portion 37. This recess portion 38 has a step portion 38a which is different in level from the remaining portion, and this step portion 38a defines the recess portion 38. The step portion 38a is formed so that a difference in level h2 of the step portion 38a is the largest at the curved portion 36 and is gradually reduced as the step portion 38a extends upwards and rearwards of the curved portion 36. As shown in FIG. 5, when viewed from the front, the step portion 38a is shaped so as to be inclined to narrow a space defined between a left- and right-hand side portions thereof as it extends upwards. Namely, in the opposite surface 30a, the recess portion 38 is formed so as to gradually spread transversely and recede deep towards the rear of the vehicle body as the recess portion 38 extends downwards. A width L1 at a recessed upper end portion 38t of the recess portion 38 is formed substantially equal to or slightly wider than a width L2 of the swelling portion 34. The recessed upper end portion 38t is formed so as to lie closer to a lower end 34d of the swelling portion 34.

The opposite surface 30a of the front lower cover 30 is formed so that an inclination at a transversely central portion which lies straight behind the front wheel 18 differs from an inclination at each of left and right transverse side portions.

In a section shown in FIG. 8A, the shape of a vertical section 30m which includes both the transverse end portions of the curved portion 36 is such that a front surface portion 36f of the curved portion 36 which is situated in a frontmost position towards the front of the vehicle is positioned further forwards than the other portions of the curved portion 36. Namely, the vertical section 30m is formed into a rearwardly inclined shape in which an upper end portion of a vertical line of the vertical section 30m is positioned further rearwards towards the rear of the vehicle body than a lower end portion thereof. On the other hand, the shape of a vertical section 30n which includes the transversely central portion of the curved portion 36 is a forwardly inclined shape, as shown in FIG. 8B, in which an upper end portion thereof is positioned further forwards towards the front of the vehicle body than the front surface portion 36f of the curved portion 36.

In this way, in the rear wall surface configuration, the opposite surface 30a is shaped so that air flows tend to stagnate at the left and right transverse side portions, while air flows tend to be caused to flow downwards at the transverse center.

In this embodiment, slits 39 are formed in the front lower cover 30 as required. The front lower cover 30 is fixed to the main frame 51 with mounting screws 80 which are screwed through holes formed in plural mounting portions 30h.

Next, referring to FIGS. 9 and 10, the undercover 25 will be described.

The front end edge 25f of the undercover 25 is connected and fixed to the rear end edge 37e of the front lower cover 30 with mounting screws 81. Both left and right side edges 25s, 25s of the undercover 25 are connected to the lower edge portions 24e of the under side covers 24. A rear end edge portion 25e of the undercover 25 is positioned at front sides of the pair of mounting links 57, 57 of the power unit 55. The undercover 25 is fixed substantially horizontally to the lower frame 53 with mounting screws 80. For example, a fuel tank 58 or the like is disposed inside the undercover 25.

The links 57, 57 extend to the rear of the vehicle body from the pivot 56 to be coupled to attaching portions 55b which are provided at a unit lower end portion 55d of the power unit 55. The lower edge portions 24e of the under side covers 24 continue to the rear end edge portion 25e of the undercover 25 and extends to lateral sides of the power unit 55 along the links 57, 57. Consequently, an opening portion 40 surrounded by the undercover 25, the lower edge portions 24e of the under side covers 24 and the unit lower end portion 55d is formed in a body bottom portion. Plural grooves 25g which rectify air flows are formed in a lower surface of the undercover 25 along a front-to-rear direction of the vehicle body. The links 57, 57 and the exhaust pipe 66 which project further downwards than the undercover 25 are disposed in the opening portion 40.

Figure 10:
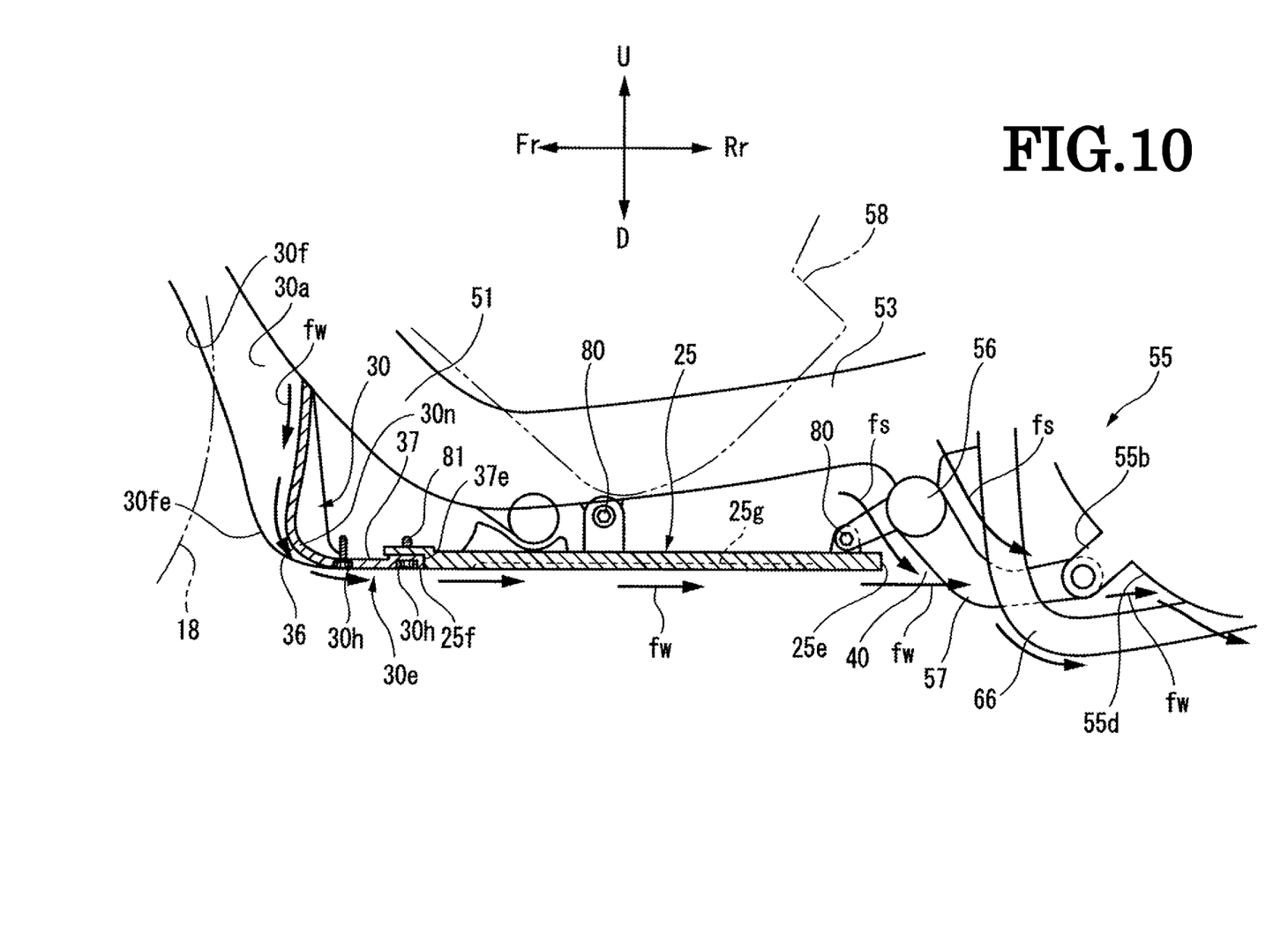
FIG. 10 is a vertical sectional view of main parts of the front lower cover and a lower cover of the motorcycle taken along the line C-C in FIG. 2.

As shown in FIG. 10, a portion of the unit lower end portion 55d which includes the attaching portions 55b is positioned further downwards of the vehicle body than the undercover 25.

Air flows produced around the front lower cover 30 and the undercover 25 when the motorcycle 1 of this embodiment is ridden will be described.

Figure 6:
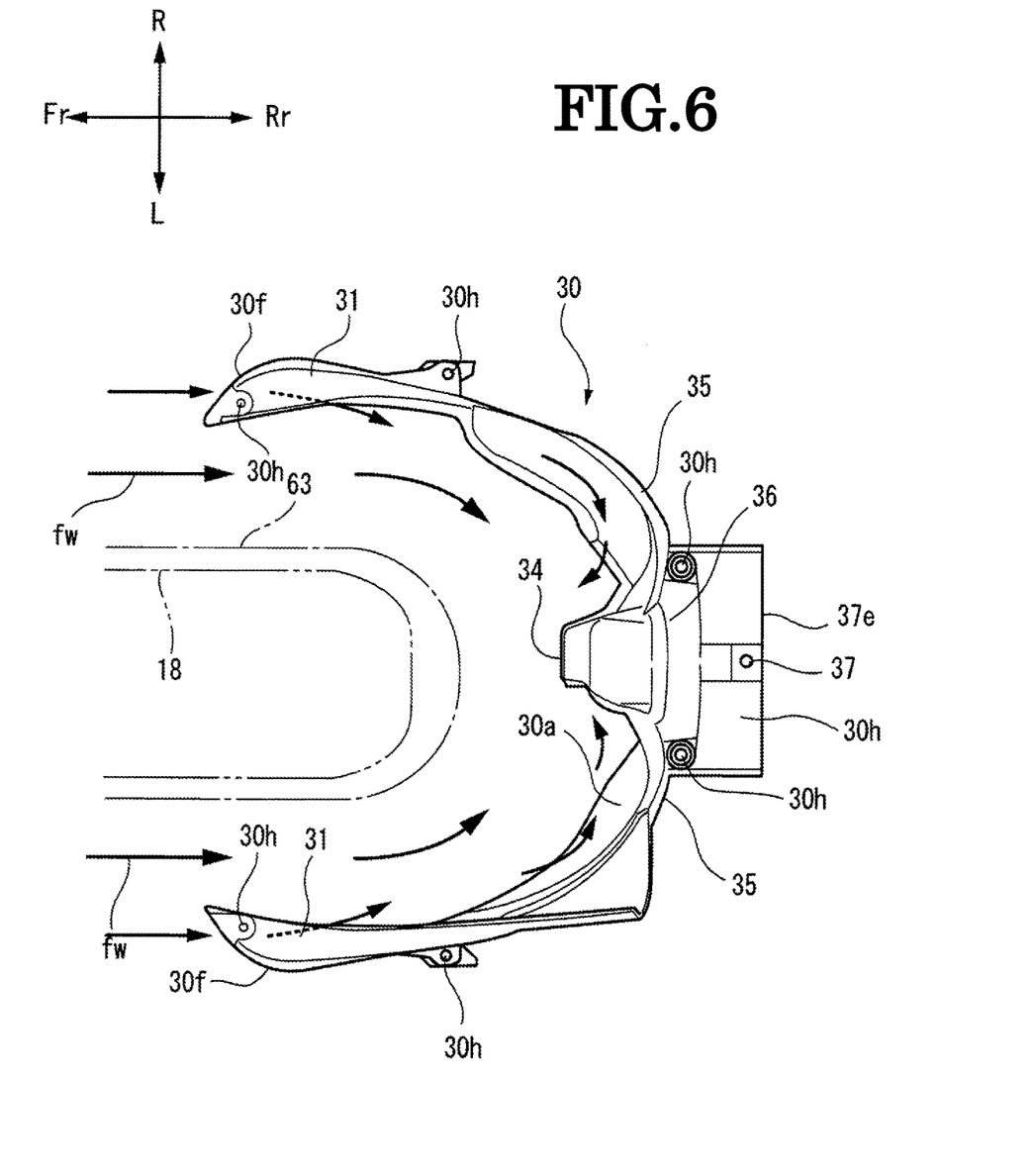
FIG. 6 is a plan view of the front lower cover on the motorcycle shown in FIG. 1.

In riding of the motorcycle 1, air flows in an area of the front cover 21 and the front wheel 18 basically flow over a surface of the body cover 20 from the front towards the rear of the vehicle body. Air flows fw which flow around a circumference of the front wheel 18 flow along the opposite surface 30a of the front lower cover 30. When viewed from the top, these air flows fw flow, for example, from both the left and right sides of the front wheel 18 along the front upper portions 31, 31 of the opposite wall 30a so as to be collected towards the central swelling portion 34, as shown in FIG. 6. When viewed from the side, the air flows fw flow, for example, along the sides of the front wheel 18 as shown in FIG. 7. Slightly downward air flows are produced in the air flows fw by the wall surfaces of the front upper portions 31, 31 which are twisted downwards. The air flows fw which pass below the front cover 21 which lies above the front wheel 18 also strike a front surface of the main frame 51, and this also produces air flows directed downwards (along the opposite surface 30a).

As shown in FIGS. 8A and 8B, the front lower cover 30 is formed into the rearwardly inclined shape in which the upper part bends to the rear along the vertical sections taken at the transverse end portions thereof. This makes it easy to collect the air flows fw which flow into the front lower cover 30 towards the transversely central portion. In addition to this, the transverse center of the front lower cover 30 continues to the main frame 51 and is formed into the forwardly inclined shape, whereby the air flows fw which are collected by the wall surfaces at the transverse ends of the front lower cover 30 are guided downwards by the wall surface (the swelling portion 34) at the transverse center thereof. In this change in inclination of the wall surface of the front lower cover 30, the inclination shifts so that the wall surface is gradually inclined forwards from the rearwardly inclined state as the wall surface runs from the transverse ends towards the transverse center thereof.

In this way, in the air flows fw flowing on the front surface side of the front lower cover 30, the air flows which are collected to the lateral center of the opposite surface 30a and the air flows which are directed downwards are produced simultaneously. Then, by the provision of the swelling portion 34 at the location where the air flows fw are collected, many of the air flows so collected are guided downwards along the swelling portion 34. As a result of this, the air flows fw which flow inside the front lower cover 30 flow downwards along the wall surface at the transverse center.

In the front lower cover 30, the curved portion 36 at the lower end portion 30e thereof is formed so that the radius of curvature at the transverse center is larger than the radii of curvature at the transverse end portions. This allows the air flows fw collected at the transverse center to flow from the transverse center towards the rear of the vehicle body with good efficiency.

The bottom portion 37 of the front lower cover 30 is continuously connected from the curved portion 36 to the undercover 25. This allows the air flows fw which flow downwards from the front lower cover 30 to flow smoothly to the rear along the undercover 25. Plural grooves 25g are formed on the bottom surface of the undercover 25, and this allows the air flows fw to flow to the rear of the vehicle smoothly while being also guided by the grooves 25g.

The swelling portion 34 provided at the upper portion 30b of the front lower cover 30 swells towards the front of the vehicle body so as to follow the main frame 51 and is also inclined rearwards and downwards. This allows the air flows fw which enter the inside of the front lower cover 30 to be guided downwards towards the bottom of the vehicle body. Consequently, the air flows fw flow smoothly downwards and rearwards.

The recess portion 38 having the step portion 38a is formed at the lower side of the swelling portion 34, and this allows the air flows fw to flow more effectively. Namely, since the recess portion 38 is the wall surface where the opposite surface 30a recedes to the rear of the vehicle body, the recess portion 38 functions to allow the air flows fw to flow thereinto. In addition to this function, since the rising wall surface of the step portion 38a extends vertically, the air flows fw are allowed to flow while being guided by the step portion 38a, whereby the air flows fw which enter the recess portion 38 are allowed to flow to the rear efficiently.

Figure 9:
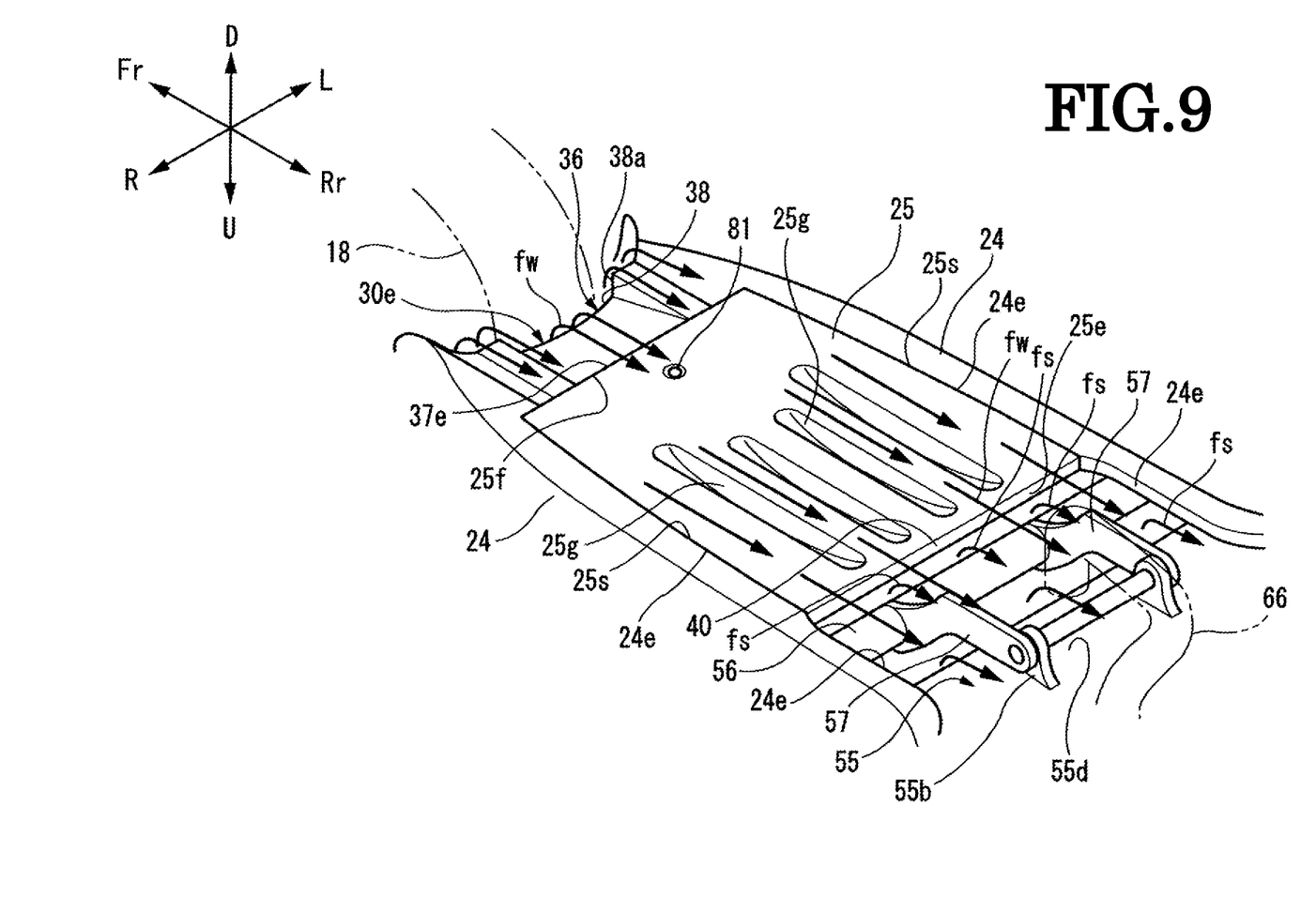
FIG. 9 is a perspective view of a main part on a rear side of a vehicle body of the motorcycle shown in FIG. 1.

As shown in FIGS. 9 and 10, the rear end edge portion 25e of the undercover 25 forms the opening portion 40, whereby the following working effects are produced. Namely, since the rear end edge portion 25e forms the opening portion 40 together with the unit lower end portion 55d of the power unit 55 and the lower edge portions 24e of the under side covers 24, when the air flows fw which flow along the undercover 25 flow to pass the position which faces the opening portion 40, suction currents fs which suck out the air inside the opening portion 40 therefrom are produced. As a result of this, the replacement of the air inside the body cover 20 and the air around the power unit 55 can be promoted. Consequently, the air around the power unit 55 is allowed to flow efficiently to thereby enhance the cooling effect.

The unit lower end portion 55d is positioned further downwards than the undercover 25, and this allows the air flows fw which flow along the undercover 25 to be directed straight to the power unit 55, thereby cooling the engine efficiently.

In this embodiment, the pair of links 57 project from the opening portion 40 to extend rearwards, and this allows the air flows fw which flow along the undercover 25 to flow to the rear of the vehicle body while being guided by the links 57.

The front lower cover 30 has the rearwardly inclined shape in which the upper part bends rearwards along the vertical sections taken at both the transverse end portions, and this enables the front lower cover 30 to have a preferable external appearance. Namely, when viewed from the side, front edge lower end portions 30fe (refer to FIG. 10) of the front edges 24f of the under side covers 24 which are attached to both the left- and right-hand sides of the front lower cover 30 can be formed into a good shape in which the front edge lower end portions 30fe are tapered off towards the front of the vehicle body.

Thus, as has been described heretofore, according to the body cover construction of the motorcycle of this embodiment, in the front lower cover 30, the curved portion 36 which curves towards the rear end edge 37e of the front lower case 30 is formed so that the radius of curvature at the transverse center is larger than the radii of curvature at the transverse end portions. This allows the air flows fw which are collected to the transverse center to flow from the transverse center to the rear of the vehicle body efficiently. As a result of this, the air drag can be reduced which would be produced by the stagnant air flows fw. The lower portion 30c of the front lower cover 30 is curved towards the rear of the vehicle body to be connected to the undercover 25. This allows the air flows fw which emerge from the front lower cover 30 to flow smoothly to the rear along the undercover 25. As a result of this, the air drag produced by the air flows fw can be reduced.

According to the body cover construction of the motorcycle of this embodiment, the rear end edge portion 25e of the undercover 25 forms the opening portion 40 together with the unit lower end portion 55d of the power unit 55 and the lower edge portions 24e of the under side covers 24. This promotes the replacement of the air inside the body cover 24 and the air around the power unit 55 by rectifying the air inside the opening portion when the air flows fw which flow from the front lower cover 30 along the undercover 25 flow to pass the position which faces the opening portion 40. Consequently, the power unit 55 can be cooled efficiently by the simple construction in which the opening portion 40 is provided.

According to the body cover construction of the motorcycle of this embodiment, the unit lower end portion 55d which makes up part of the power unit 55 is positioned further downwards of the vehicle body than the undercover 25. This allows the air flows fw which flow along the undercover 25 to be directed straight to the power unit 55, thereby cooling the engine efficiently by the air flows fw.

According to the body cover construction of the motorcycle of this embodiment, the recess portion 38 is formed which has the step portion 38a and which recedes more to the rear of the vehicle body at the transversely central portion than at the transversely outer portions at the lower portion 30c of the front lower cover 30. This makes it easy to guide the air flows fw which are directed to the transversely central portion to the central portion further, thereby achieving the effective air flows. The air flows collected to the central portion can be guided to the bottom and rear of the vehicle body by the step portion 38, whereby the air flows fw can be guided towards the rear of the vehicle body smoothly. This allows the air flows fw to flow to the rear more effectively, thereby reducing the air drag by the air flows fw.

According to the body cover construction of the motorcycle of this embodiment, the swelling portion 34 provided at the upper portion 30b of the front lower cover 30 is formed so that the upper part swells towards the front of the vehicle, while the lower part is inclined towards the rear of the vehicle body so as to follow the main frame 51. This can make it easy to guide the air flows fw which enter the front lower cover 30 towards the bottom of the vehicle body. Consequently, the air flows fw are allowed to flow to the bottom and rear of the vehicle body effectively, thereby reducing the resistance by the air flows fw.

According to the body cover construction of the motorcycle of this embodiment, in the front lower cover 30, the vertical cutting line 39m along the transverse end portions which include the curved portion 36 is formed into the rearwardly inclined shape in which the upper part is positioned further rearwards towards the rear of the vehicle body than the front surface portion 36f of the curved portion 36. This can make it easy to collect the air flows fw which flow into the front lower cover 30 to the transversely central portion. In addition to this, the transverse center is formed into the forwardly inclined shape, and this allows the air flows fw collected to the transversely central portion to be guided downwards by the transversely central wall surfaces to flow towards the rear of the vehicle body effectively. As a result of this, many air flows fw are allowed to flow along the transversely central wall surfaced, thereby reducing the resistance of the air flows fw.

The invention is not limited to the embodiment described above and hence can be modified as required without departing from the spirit and scope of the invention.

For example, in the embodiment, while the radius of curvature of the curved portion 36 is formed so as to change gradually from the transverse center towards the transverse end portions, the invention is not limited thereto. For example, the radius of curvature may be formed so as to be reduced step by step through plural steps.

DESCRIPTION OF REFERENCE NUMERALS AND CHARACTER 1 motorcycle
10 body frame
10a body front portion
11 steering handlebar 12 mounting seat
15 headstock
18 front wheel
19 rear wheel
20 body cover
21 front cover
22 inner cover
23 foot platform
24 under side cover
24e lower edge portion
25 undercover
25e rear end edge portion
26 center cover
27 side cover
28 lower side cover
30 front lower cover
30a opposite surface
30b upper portion
30c lower portion
30e lower end portion
30m, 30n vertical cutting line
34 swelling portion
36 curved portion
36f front surface portion
38 recess portion
38a step portion
40 opening portion
51 main frame
55 power unit
55d unit lower end portion
fw air flow

The invention claimed is:

1. A body cover construction for a motorcycle comprising a body cover having:
- a front cover which covers a front portion of a vehicle body from a front to sides of a headstock;
- a front lower cover which covers a front surface of the vehicle body, below the front cover and which has a curved opposite surface which continues from above to a rear of a front wheel to face opposite the front wheel; and
- an undercover which covers a lower surface of the vehicle body lying further forwards than a power unit in a position lying further rearwards than the front lower cover, wherein a lower end portion of the front lower cover has a curved portion and is thus allowed to extend rearwards to be connected to the undercover, and wherein the curved portion is formed so that a radius of curvature at a transverse center is larger than radii of curvature at transverse end portions thereof.

2. The body cover construction for the motorcycle of claim 1, wherein a rear end edge portion of the undercover forms an opening portion together with a unit lower end portion of the power unit and a lower edge portion of the body cover.

3. The body cover construction for the motorcycle of claim 1, wherein part of the power unit is positioned further downwards than the undercover.

4. The body cover construction for the motorcycle of claim 1, wherein a recess portion is provided at a lower portion of the front lower cover, and the recess portion recedes more at a transversely central portion than at transversely outer portions of the lower portion toward a rear of the vehicle body and has a step portion.

5. The body cover construction for the motorcycle of claim 1, wherein a swelling portion is provided at an upper portion of the front lower cover, the swelling portion projecting forwards at a transverse center of the front lower cover and accommodating at least part of a main frame which extends downwards and rearwards from the headstock.

6. The body cover construction for the motorcycle of claim 1, wherein a vertical cutting line along each of transverse end portions of the front lower cover which include the curved portion is formed into a rearwardly inclined shape in which an upper part of the vertical cutting line is positioned further rearwards than a front surface portion of the curved portion, and wherein a vertical cutting line along a transverse center of the front lower cover which includes the curved portion is formed into a forwardly inclined shape in which an upper part of the vertical cutting line is positioned further forwards than the front surface portion of the curved portion.

* * * * *